United States Patent
Schneider et al.

(10) Patent No.: US 9,302,701 B2
(45) Date of Patent: Apr. 5, 2016

(54) VEHICLE STEERING SYSTEM TRANSMISSION

(71) Applicant: THE GATES CORPORATION, Denver, CO (US)

(72) Inventors: Dean Schneider, Washington, MI (US); Alexander Serkh, Troy, MI (US); Ian Fitzner, DeWitt, MI (US); Clermont Kirouac, Richelieu (CA)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 14/456,521

(22) Filed: Aug. 11, 2014

(65) Prior Publication Data

US 2016/0039451 A1    Feb. 11, 2016

(51) Int. Cl.
*B62D 5/04* (2006.01)
*F16H 7/02* (2006.01)

(52) U.S. Cl.
CPC ............ *B62D 5/0481* (2013.01); *B62D 5/0409* (2013.01); *F16H 7/023* (2013.01)

(58) Field of Classification Search
CPC ..... B62D 5/0409; B62D 5/0481; F16H 7/023
USPC ............ 73/117.02; 74/388 PS; 180/443, 444; 474/84, 88, 148
See application file for complete search history.

(56) References Cited

U.S. PATENT DOCUMENTS

| | | | |
|---|---|---|---|
| 3,580,352 A * | 5/1971 | Hestad et al. | 180/402 |
| 4,577,716 A | 3/1986 | Norton | |
| 4,681,182 A | 7/1987 | Suzuki et al. | |
| 4,825,972 A | 5/1989 | Shimizu | |
| 4,986,381 A | 1/1991 | Morishita et al. | |
| 6,129,061 A | 10/2000 | Okuda et al. | |
| 6,505,587 B1 | 1/2003 | Scheidt | |
| 6,892,605 B2 * | 5/2005 | Menjak | 74/552 |
| 7,541,803 B2 | 6/2009 | Schafer et al. | |
| 7,654,693 B2 | 2/2010 | Rasmussen et al. | |
| 8,297,401 B1 | 10/2012 | Schneider et al. | |
| 8,312,959 B1 | 11/2012 | Schneider et al. | |
| 8,327,972 B1 | 12/2012 | Schneider et al. | |
| 2005/0098376 A1 | 5/2005 | Ozsoylu et al. | |
| 2005/0257985 A1 | 11/2005 | Fukushima et al. | |
| 2007/0012506 A1 | 1/2007 | Asada | |
| 2007/0175695 A1 * | 8/2007 | Bishop et al. | 180/444 |
| 2008/0023257 A1 * | 1/2008 | Budaker et al. | 180/444 |
| 2010/0094507 A1 | 4/2010 | Mitsuhara | |

FOREIGN PATENT DOCUMENTS

DE      102006036183 A1    2/2008

OTHER PUBLICATIONS

European Patent Office, International Search Report application No. PCT/US2015/043644, mailing date Nov. 5, 2015.

* cited by examiner

*Primary Examiner* — Anne Marie Boehler
*Assistant Examiner* — Felicia L Brittman
(74) *Attorney, Agent, or Firm* — Jeffrey A. Thurnau, Esq.; Paul N. Dunlap, Esq.

(57) ABSTRACT

A vehicle steering system transmission comprising a driver connected to a driver shaft, the driver shaft connected to an output shaft by a flexible link, a first sensor sensing the driver shaft, a control unit receiving a signal from the first sensor, and the control unit transmitting a signal to the driver to control an output shaft movement.

15 Claims, 4 Drawing Sheets

VEHICLE STEERING SYSTEM TRANSMISSION

FIELD OF THE INVENTION

The invention relates to a vehicle steering system transmission, and more particularly, to a vehicle steering system transmission comprising a driver connected to a driver shaft, the driver shaft connected to an output shaft by a flexible link, a first sensor sensing the driver shaft, a control unit receiving a signal from the first sensor, and the control unit transmitting a signal to the driver to control an output shaft movement.

BACKGROUND OF THE INVENTION

Electric power assist steering systems (EPAS) have been around since the 1960's. Hydraulic power assist steering has traditionally dominated the market. Hydraulic systems have high parasitic energy loss when the hydraulic pump is pumping, but power assist is not required. Early attempts to eliminate this parasitic loss involved fitting an electric motor to the pump and only driving the pump when necessary.

Electric hydraulic assisted power steering systems use an electric motor to drive a hydraulic pump to feed a hydraulic power steering system. These systems are an intermediate step by the industry and their use will likely fade with the increased use of EPAS. EPAS systems allow realization of reduced noise, reduced energy use, active safety features, and adjustability to meet driving conditions. However, the use of these systems has remained limited until recent C.A.F.E. requirements became more difficult to meet. This is driving automotive manufactures to turn to EPAS systems more and more in an effort to improve vehicle fuel economy. EPAS systems eliminate the parasitic losses typically found in hydraulic assist power steering systems. System manufacturers such as Nexteer make claims of 6% fuel economy improvements.

For example, one difficulty that slowed implementation of EPAS systems was meeting the power requirement with a 12 volt electric motor. Recently systems have been developed that successfully solve this problem. Further, all EPAS systems require a control module to sense driver input and control the electric motor to provide the desired assist. The control module measures driver input torque and uses this to determine the amount of assist required. Assist can be tuned to meet the drivers need depending on driving conditions. The system can even have a tunable "feel" available to the driver.

Even though the main driver for automotive EPAS is fuel economy improvement, EPAS has additional benefits. The system can make steering assist available even when the vehicle's engine is not running. It also enables the use of the automatic parallel parking systems available today.

There are two main types of EPAS systems; column assist and rack assist. Rack assist EPAS systems have an electric motor that is connected to the steering rack. The electric motor assists the rack movement usually through driving a lead screw mechanism. Column assist EPAS systems have an electric motor connected to the steering column. The electric motor assists the movement of the column shaft usually through a worm gear type arrangement. One advantage of these types of systems is the electric motor can be placed in the passenger compartment freeing up valuable space under the hood. This also keeps any sensitive electrical components out of the harsh under hood environment.

Worm drive column assist systems are usually used in small cars where the assist power requirements are lower than what would be needed in a large heavy vehicle. These systems are limited by the speed of the steering wheel and the ratio of the worm drive. The steering wheel at its fastest speed rotates relatively slowly at approximately 60 rpm. With a 60 rpm speed of the steering wheel and a worm drive ratio of 15:1, the max speed of the electric motor would only be 900 rpm. Worm drives are limited to ratios under 20:1 because ratios higher than that cannot be back-driven.

The steering system must be able to be operated with no power. This requires the worm drive be able to operate with the gear driving the worm (back-driven). Having a low motor speed and limited ratio worm drive causes the need for high torque motor. Even with a high torque motor, these types of systems have not been made successful on heavy vehicles. Small vehicles are light and require less steering effort thus enabling the use of these systems. Worm drive column assist EPAS systems are the lowest cost systems and thus also lend themselves to smaller less expensive vehicles.

Typical steering systems with worm drive assists are limited in their efficiency. EPAS systems must be designed to operate when there is no power available. Due to the nature of worm drive's tendency to lock up during back driving when ratios exceed approximately 20:1, worm drive EPAS systems efficiency is not greater than approximately 85% and nearer to 65% during back-driving conditions.

Representative of the art is U.S. Pat. No. 8,327,972 which discloses a vehicle steering system transmission comprising a housing, an input shaft journalled to the housing, an electric motor connected to the housing and coupled to the input shaft, an output shaft journalled to the housing, the input shaft and the output shaft coupled by a first pair of sprockets having a first belt trained therebetween and having a first ratio, the first belt and first pair of sprockets comprising a helical tooth configuration, the input shaft and the output shaft coupled by a second pair of sprockets having a second belt trained therebetween and having a second ratio, and the input shaft and the output shaft coupled by a third pair of sprockets having a third belt trained therebetween and having a third ratio.

What is needed is a vehicle steering system transmission comprising a driver connected to a driver shaft, the driver shaft connected to an output shaft by a flexible link, a first sensor sensing the driver shaft, a control unit receiving a signal from the first sensor, and the control unit transmitting a signal to the driver to control an output shaft movement. The present invention meets this need.

SUMMARY OF THE INVENTION

The primary aspect of the invention is a vehicle steering system transmission comprising a driver connected to a driver shaft, the driver shaft connected to an output shaft by a flexible link, a first sensor sensing the driver shaft, a control unit receiving a signal from the first sensor, and the control unit transmitting a signal to the driver to control an output shaft movement.

Other aspects of the invention will be pointed out or made obvious by the following description of the invention and the accompanying drawings.

The invention comprises a vehicle steering system transmission comprising a driver connected to a driver shaft, the driver shaft connected to an output shaft by a flexible link, a first sensor sensing the driver shaft, a control unit receiving a signal from the first sensor, and the control unit transmitting a signal to the driver to control an output shaft movement.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
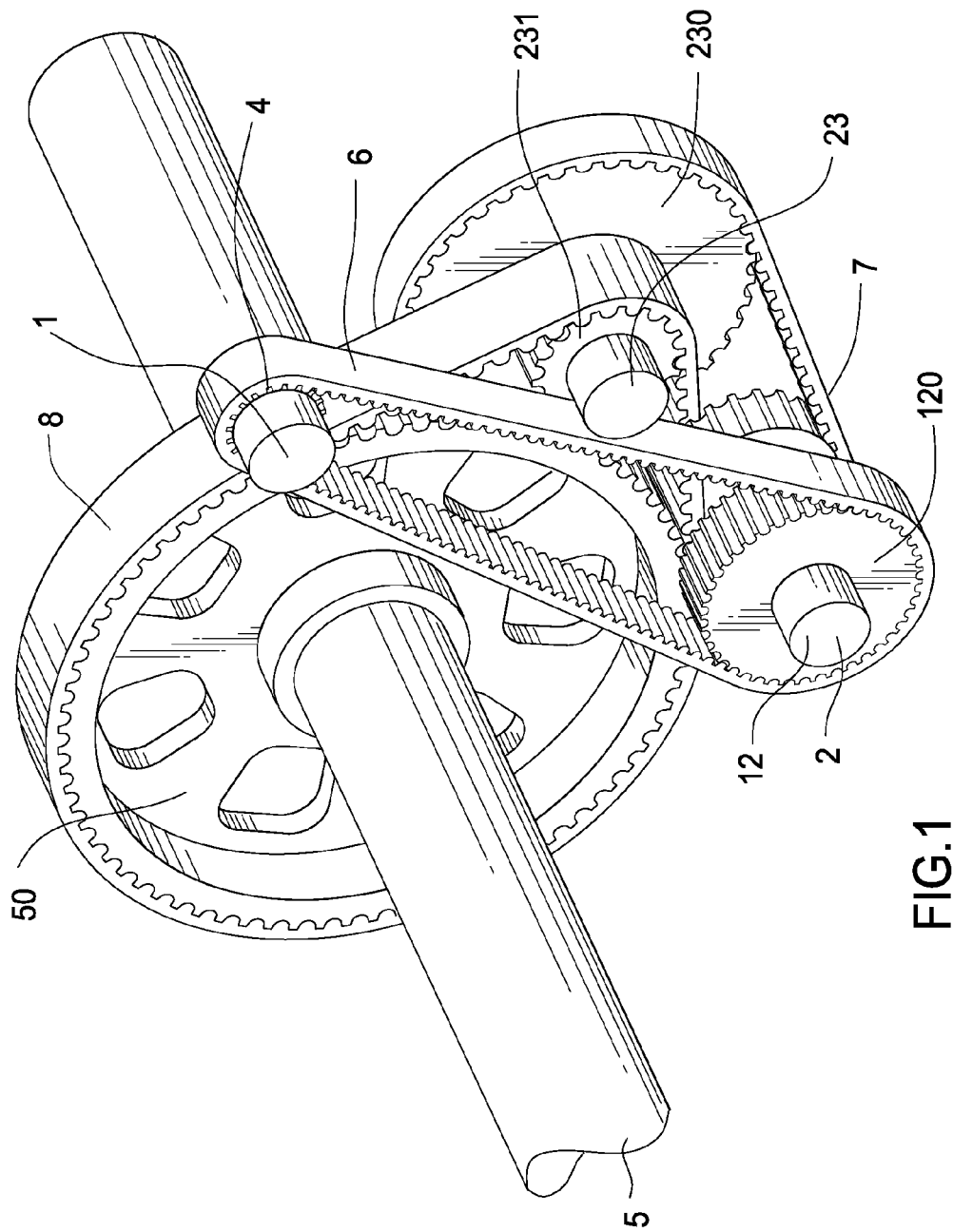
FIG. 1 is a perspective view of the system transmission.

FIG. 1 is a perspective view of the system transmission. The inventive device comprises sensor 1, sensor 2, sensor 3. Sensor 1 is mounted to input shaft 4. Sensor 2 is mounted to intermediate shaft 12. Sensor 3 is mounted to intermediate shaft 23. Flexible link 6 is trained between input shaft 4 and intermediate shaft 12. Flexible link 7 is trained between intermediate shaft 12 and intermediate shaft 23. Belt 8 is trained between intermediate shaft 23 and output shaft 10. Each belt comprises a mechanical linkage between the respective sprockets.

Input sprocket 4 is driven by an electric motor or any other device providing rotation and torque. Sensor 1 measures the angular position of input shaft 4. Sensor 2 measures the angular position of intermediate shaft 12. Sensor 3 measures the angular position of intermediate shaft 23. Input shaft 4 has 20 teeth. Flexible link 6 and flexible link 7 may each comprise a toothed belt or a chain.

Figure 2:
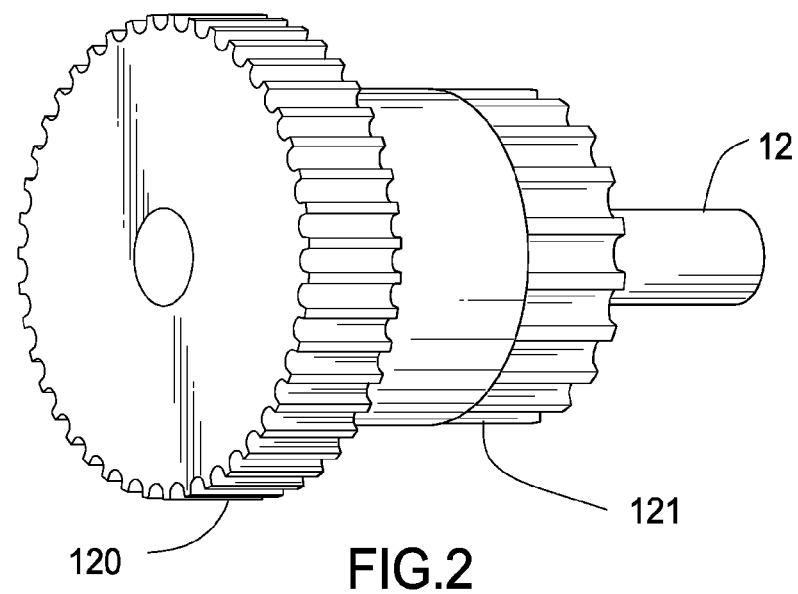
FIG. 2 is a perspective view of an intermediate sprocket.
Figure 3:
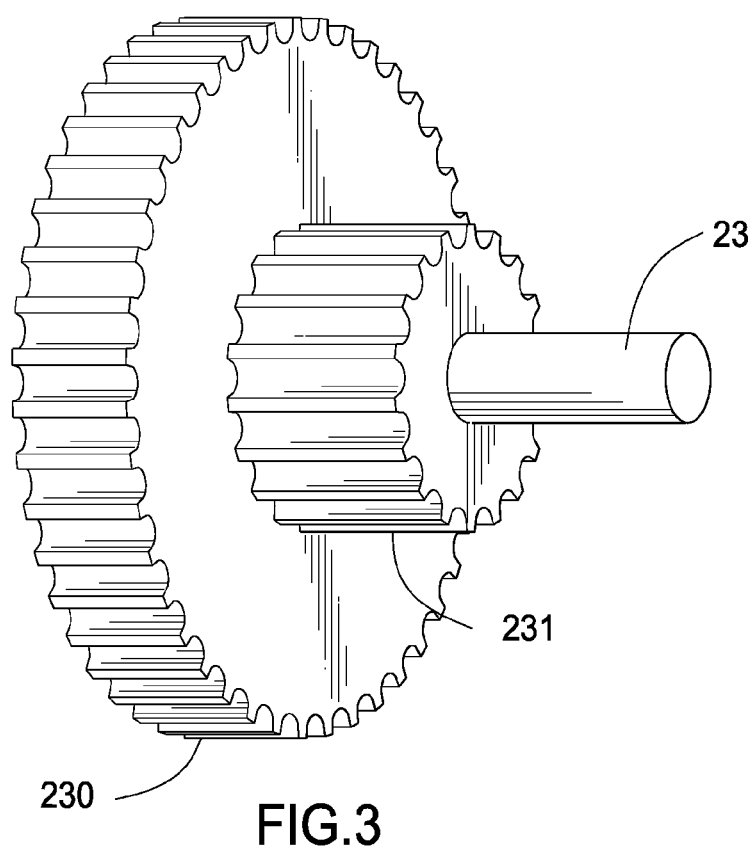
FIG. 3 is a perspective view of an intermediate sprocket.

Intermediate shaft 12 comprises a first sprocket 120 and a second sprocket 121. Sprocket 120 has 43 teeth, sprocket 121 has 18 teeth (see FIG. 2). Input shaft 4 and sprocket 120 are connected through flexible link 6. Intermediate shaft 23 has first sprocket 230 and second sprocket 231. Sprocket 230 has 41 teeth. Sprocket 231 has teeth. Sprocket 121 and Sprocket 230 are connected through flexible link 7. Output shaft 5 has 73 teeth. Sprocket 231 and output shaft 5 are connected through flexible link 8.

To operate properly, the initial starting position of the three shafts 4, 12, 23 with sensors 1, 2, 3 must be known as well as the position of the output shaft 5. From this starting position, the position of each shaft can be measured as a result of rotation of input shaft 4. The angular position of each sprocket can be calculated since we know the drive ratio at each stage and the overall drive ratio.

For example, given:
$\theta_1$=angle of input shaft 4 from its starting position (in turns where one turn=360 degrees)
$N_n$=ratio of drive to each sprocket from the input sprocket
$\theta_n$=angle of the shaft from its starting position (in turns)

The angular position of each shaft can be determined with the following equation:

$$\theta_n = N_n \theta_1$$

For a rotation of the input shaft 4 of 20 revolutions, intermediate shaft 12 rotates $$\theta_{12} = (20/43)(20)$$

$$\theta_{12} = 9.3023 \text{ turns}$$

The fractional portion of the number of turns is then converted to an angular position.

$$0.3023 \text{ turns} = 0.3023 * 360 \text{ degree/turn} = 108.28 \text{ degrees}$$

This result represents the number of degrees of rotation from the original starting position of intermediate shaft 12.

Since the drive ratio at each sprocket in the drive is known, one can determine the position of each shaft from its starting position.

The inventive device is configured such that each position of output shaft 5 corresponds to only one unique position of the three other shafts. If power is lost in the system, when power returns, the position of output shaft 5 can be determined by the position of the three shafts with sensors. If a drive is not limited in the number of revolutions of the output shaft, the positions of the individual shafts will eventually return to their respective starting positions and the shaft relative positions will repeat.

In devices such as electric assist steering systems, where the output shaft is the vehicle steering shaft it is advantageous to know the position of the steering shaft. To avoid losing the known position of the output shaft, the arrangement of the drive ratios must be such that the number of turns required to cause repeating of the positions exceeds the total number of turns in the drive.

In the system described above, one can compare the original starting position of each shaft with its current position. When all three current positions align with their original position within the tolerance zone of the sensor, the unique position is then repeating itself. The tolerance of the position sensors expands the possible positions of each shaft during sensing of shaft position.

For example, if sensor 1 indicates input shaft 4 is at a position 5 degrees clockwise from its original position, sensor 2 can only indicate a position for intermediate shaft 12 that is equal to a whole number of turns of input shaft 4 plus the 5 degrees of rotation from its starting position multiplied by the fixed ratio of drive stage 1. For this consideration, assume all starting positions correspond to the vertical position. For example, if input shaft 4 rotates 5 degrees, intermediate shaft 12 must only have rotated 5 degrees×(20/43)=2.325 degrees. If input shaft 4 rotated one turn plus 5 degrees, intermediate shaft 12 must have rotated (360+5)×(20/43)=169.767 degrees. This same logic holds true for the position of intermediate shaft 23. Continuing with the same example, intermediate shaft 23 must have rotated 5 degree×(20/42)×(19/43)=1.027 degrees for a 5 degree rotation of input shaft 4. For one turn plus 5 degrees rotation of input shaft 4, intermediate shaft 23 rotates 75.013 degrees.

For each position of input shaft 4, there is only one corresponding position of both intermediate shaft 12 and intermediate shaft 23. These positions are used mainly to indicate the number of turns of input shaft 4. For example, if sensor 3 on intermediate shaft 23 indicates an angle of 16.4 degrees, and sensor 1 indicates an angle of 5 degrees and sensor 2 indicates and angle of 169.7 degrees, the number of turns that input shaft 4 turned corresponds to 44 turns. So the position of output shaft 5 is determined as (44 turns×(360 deg/turn)+5 degrees)×(20/43)(19/34)(18/73)=802.9 degrees. This corresponds to two turns plus 82.95 degrees or 2.23 turns from its start position.

The accuracy of the final position of output shaft 5 is determined by the accuracy of the sensor 1 on input shaft 4. The location of output shaft 5 is known with an accuracy that is equal to the accuracy of sensor 1 divided by the drive ratio. For example, if sensor 1 has a position tolerance of 5 degrees on the above drive with an overall ratio of 19.73, the position of output shaft 5 can be determined within 5/19.73 degrees or 0.25 degrees. This sensor arrangement gives one the ability to gain significant position accuracy relative to the accuracy of individual position sensors. This arrangement provides improved accuracy when compared to placing a sensor on the output shaft without changing the accuracy of the sensor itself.

For a given sensor tolerance, one must include this tolerance in determining the number of revolutions of input shaft 4 required to cause the shaft positions to repeat. Analysis of the inventive device shows that with a position tolerance of 5 degrees on each sensor, the shaft positions repeat every 258 revolutions of input shaft 4. This equates to 13.07 revolutions of output shaft 5. To track accurately the position of output shaft 5, its travel must be limited to less than 13.07 total revolutions in order to avoid repeating the shaft positions.

To maximize the total rotations between repeats of the shaft positions, the ratios of each stage should be arranged such that they are not whole numbers. For example, in the inventive device, the ratio of drive stage 1 is 43/20=2.15, the ratio of drive stage 2 is 43/19=2.26, and the ratio of drive stage 3 is 73/18=4.05. Changing drive stage 1 such that its ratio is the nearest whole number, for example 40/20=2, causes the shaft positions to repeat every 68 revolutions of input shaft 4 given the same sensor accuracy. The ratios of the drive should be arranged such that the repeating pattern of the positions of the shafts is large enough to exceed the number of revolutions required for the output shaft.

In the examples, each sensor has a 5 degrees accuracy tolerance. If one increased the accuracy of sensor 1 to 2.5 degrees one could double the tolerance on the other two sensors (2,3) and maintain the same number of revolutions (258) until the shaft positions repeated. This would also improve the accuracy of detecting the position of output shaft 5 from 0.25 degrees to 0.125 degrees of error.

Doubling the accuracy of sensor 1 to 2.5 degrees and maintaining the 5 degree tolerance on sensors 2 and 3 increases the number of revolutions until the shaft positions repeat to 1849. This improves the total number of revolutions of the device to 93.7 from 13.07 in the example here.

The accuracy of sensor 1 determines the overall positional accuracy of the drive, hence, sensor 2 and sensor 3 can have twice the tolerance of sensor 1 and the device can still maintain the same number of revolutions to repeat the shaft positions.

For the arrangement of the sensor 1, sensor 2, sensor 3 to be effective in determining the position of the output shaft 5, the ratios of the drive stages must be such that one revolution of input shaft 4 causes at least one of the other shafts to move to a position that is outside its possible previous position inclusive of the tolerance of the sensor.

For example, given:
T=1 turn of input shaft
N=Ratio to interested shaft
E=sensor error (in turns)
Then:

$$TN > E$$

$$1(20/43) > 5/360$$

$$0.4651 > 0.01389$$

Figure 4:
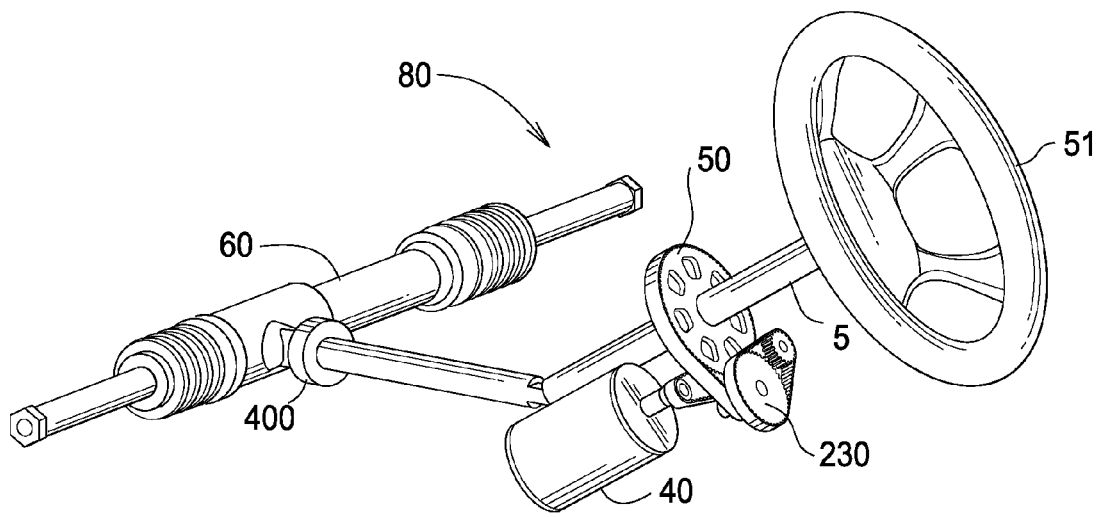
FIG. 4 is a perspective view of a steering system.

FIG. 4 is a perspective view of a steering system. Output shaft 5 is the steering shaft for a steering system 80. Steering wheel 51 is connected to steering shaft 5. Shaft 5 is connected to a steering rack 60. Steering rack 60 is connected to the vehicle wheels for steering, not shown. In this embodiment, motor 40 comprises a Johnson Electric EPS-B77. The motor listed herein is only an example and is not intended to limit the scope or use of other suitable motors.

Figure 5:
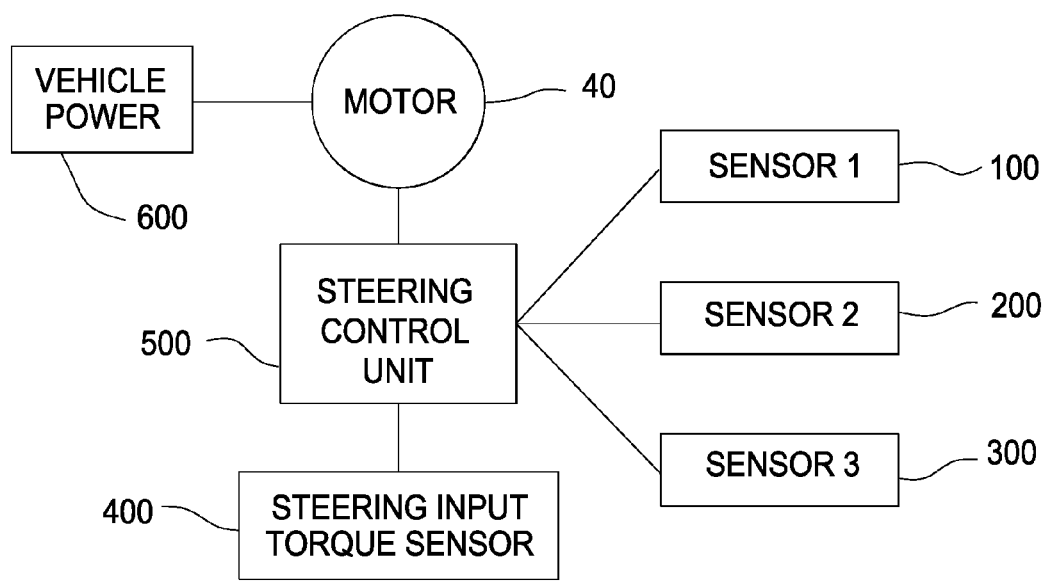
FIG. 5 is a schematic diagram of the control system.

FIG. 5 is a schematic diagram of the control system. Sensor 1 transmits an angular position signal for shaft 4 to the steering control unit 500. Sensor 2 detects an angular position of shaft 12 and transmits a signal to steering control unit 500. Sensor 3 detects an angular position of shaft 23 and transmits a signal to steering control unit 500. In addition, a torque sensor 400 detects a torque load applied to shaft 10 by a user. Torque sensor transmits a signal to steering control unit 500. Steering control unit 500 processes the signals from the position sensors (1,2,3) and torque sensor to determine a control requirement for the motor 40. Unit 500 then transmits a control signal to the motor 40, which in turn applies a boost torque to shaft 10. Motor 40 is connected to vehicle power 600. Sensors 1, sensor 2, sensor 3 comprise Gill Blade 360 Rotary Sensors. Torque sensor 400 comprises a TT Electronics model SX-4428. The sensors listed herein are only examples and are not intended to limit the scope or use of other suitable sensors.

Figure 6:
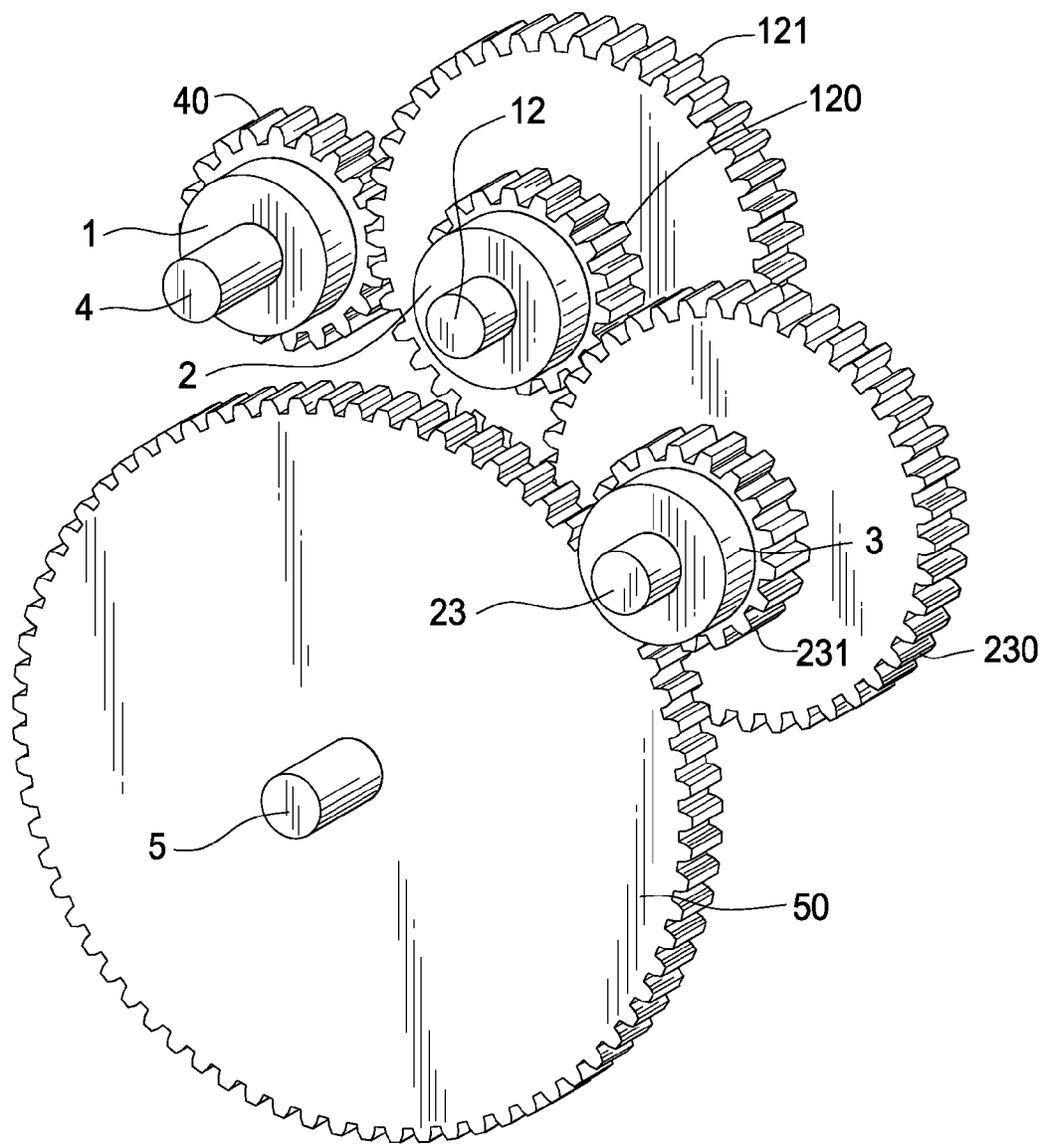
FIG. 6 is a perspective view of an alternate embodiment.

FIG. 6 is a perspective view of an alternate embodiment. In an alternate embodiment, the inventive device comprises sensor 1, sensor 2, sensor 3. Sensor 1 is mounted to input shaft 4. Sensor 2 is mounted to intermediate shaft 12. Sensor 3 is mounted to intermediate shaft 23. Input shaft 4 is driven by an electric motor 40 or any other device providing rotation and torque. Sensor 1 measures the angular position of input shaft 4. Sensor 2 measures the angular position of intermediate shaft 12. Sensor 3 measures the angular position of intermediate shaft 23. Input shaft 4 comprises a gear 40 with 20 teeth.

Intermediate shaft 12 consists of first gear 120 and second gear 121. Gear 120 has 43 teeth. Gear 121 has 18 teeth. Each gear pair between shafts comprises a mechanical linkage. Input shaft 4 drives gear 120. Intermediate shaft 23 has first gear 230 and second gear 231. Gear 230 has 41 teeth. Gear 231 has 18 teeth. Gear 121 drives gear 230. Output gear 50 has 73 teeth. Gear 231 drives output shaft 5.

Except as described as follows, the calculations for the gear drive system are the same as for the belt drive system.

Since the sensors have a tolerance, one must include this tolerance in determining the number of revolutions of input shaft 4 required to cause the shaft positions to repeat. Analysis of the inventive device shows that with a position tolerance of 5 degrees on each sensor, the shaft positions repeat every 387 revolutions of input shaft 4. This equates to 19.49 revolutions of output shaft 5. To fully track the position of output shaft 5, its travel must be limited to less that this 19.49 total revolutions to avoid repeating the shaft positions.

To maximize the total travel between repeats of the shaft positions, the ratios of each stage of the drive should be arranged such that they are not whole numbers. For example, in the inventive device, the ratio of drive stage 1 is 43/20=2.15, the ratio of drive stage 2 is 43/19=2.26, and the ratio of drive stage 3 is 73/18=4.05. Changing drive stage 1 such that its ratio is the nearest whole number, for example 40/20=2, causes the shaft positions to repeat every 32 revolutions of input shaft 4 given the same sensor accuracy. The ratios of the drive should be arranged such that the repeating pattern of the positions of the shafts is large enough to exceed the number of revolutions required for the output shaft.

In the examples given here, the sensors each have the same 5 degrees accuracy tolerance. If the accuracy of sensor 1 is increased to 2.0 degrees, one could increase the tolerance on the other two sensors to 5.0 degrees and maintain the same number of revolutions (387) until the shaft positions repeated. This would also improve the accuracy of the position of output shaft 5 from 0.25 degrees to 0.125 degrees of error.

Doubling the accuracy tolerance of sensor 1 to 2.5 degrees and maintaining the 5 degree tolerance on sensors 2 and 3 improves the number of revolutions for which the shaft positions repeat to 1763. This improves the total number of revolutions of the device to 88.77 from 19.49 in the given example. The accuracy of sensor 1 determines the overall positional accuracy of the drive. Sensors 2 and 3 can have greater tolerance and the device can maintain the same number of revolutions to repeat the shaft positions.

Although forms of the invention have been described herein, it will be obvious to those skilled in the art that variations may be made in the construction and relation of parts without departing from the spirit and scope of the invention described herein.

We claim:

1. A vehicle steering system transmission comprising:
   a driver connected to a driver shaft;
   the driver shaft connected to an output shaft by a first flexible link;
   a first sensor sensing the driver shaft angular position;
   a second shaft, the second shaft connected to the driver shaft by the first flexible link and connected to the output shaft by a second flexible link;
   a second sensor sensing the second shaft angular position;
   a control unit receiving a signal from the first sensor and second sensor; and
   the control unit transmitting a signal to the driver to control an output shaft movement.

2. The vehicle steering system transmission as in claim 1, wherein the flexible link comprises a belt.

3. The vehicle steering system transmission as in claim 1 wherein the flexible link comprises a chain.

4. The vehicle steering system transmission as in claim 1, wherein the control unit is in communication with a vehicle control system.

5. The vehicle steering system transmission as in claim 1, wherein the output shaft comprises a vehicle steering shaft.

6. The vehicle steering system transmission as in claim 5 further comprising a third sensor sensing the vehicle steering shaft.

7. The vehicle steering system transmission as in claim 6, wherein the third sensor senses a torque.

8. The vehicle steering system transmission as in claim 7, wherein the third sensor transmits a signal to the control unit.

9. A vehicle steering system transmission comprising:
   a driver connected to a driver shaft;
   the driver shaft connected to an output shaft by a first linkage;
   a first sensor sensing the driver shaft angular position;
   a second shaft, the second shaft connected to the driver shaft by the first linkage and connected to the output shaft by a second linkage;
   a second sensor sensing the second shaft angular position;
   a control unit receiving a signal from the first sensor and the second sensor; and
   the control unit transmitting a signal to the driver to control an output shaft movement.

10. The vehicle steering system transmission as in claim 9, wherein the control unit is in communication with a vehicle control system.

11. The vehicle steering system transmission as in claim 9, wherein the output shaft comprises a steering shaft.

12. The vehicle steering system transmission as in claim 11 further comprising a third sensor sensing the steering shaft.

13. The vehicle steering system transmission as in claim 12, wherein the third sensor senses a torque.

14. The vehicle steering system transmission as in claim 13, wherein the third sensor transmits a signal to the control unit.

15. The vehicle steering system transmission as in claim 9, wherein the first linkage comprises a belt.

* * * * *